United States Patent
Sines

(10) Patent No.: US 8,561,407 B2
(45) Date of Patent: Oct. 22, 2013

(54) HYBRID SOLAR COLLECTOR AND GEO-THERMAL CONCEPT

(76) Inventor: Eddie Sines, Manassas, VA (US)

(*) Notice: Subject to any disclaimer, the term of this patent is extended or adjusted under 35 U.S.C. 154(b) by 259 days.

(21) Appl. No.: 12/991,912

(22) PCT Filed: May 18, 2009

(86) PCT No.: PCT/US2009/003073
§ 371 (c)(1),
(2), (4) Date: Nov. 10, 2010

(87) PCT Pub. No.: WO2009/139926
PCT Pub. Date: Nov. 19, 2009

(65) Prior Publication Data

US 2011/0062724 A1    Mar. 17, 2011

Related U.S. Application Data

(60) Provisional application No. 61/071,781, filed on May 16, 2008.

(51) Int. Cl.
*B60K 16/00* (2006.01)
*F03G 6/00* (2006.01)
*F03G 7/00* (2006.01)

(52) U.S. Cl.
USPC .............. 60/641.8; 60/641.2; 60/671; 60/676

(58) Field of Classification Search
USPC ................ 60/651, 671, 641.1–641.15, 641.2, 60/641.8; 290/1 R; 62/259.1, 260; 126/623; 165/45
See application file for complete search history.

(56) References Cited

U.S. PATENT DOCUMENTS

| | | | |
|---|---|---|---|
| 3,995,429 A * | 12/1976 | Peters | 60/641.8 |
| 4,306,416 A | 12/1981 | Iozzi | |
| 4,373,308 A * | 2/1983 | Whittaker | 52/173.3 |
| 5,272,879 A * | 12/1993 | Wiggs | 60/676 |
| 5,288,336 A | 2/1994 | Strachan et al. | |
| 6,575,234 B2 | 6/2003 | Nelson | |
| 7,900,450 B2 * | 3/2011 | Gurin | 60/641.2 |
| 7,992,631 B2 * | 8/2011 | Brett | 165/244 |
| 8,047,905 B2 * | 11/2011 | Everett et al. | 454/187 |
| 2003/0074895 A1 | 4/2003 | McFarland | |
| 2006/0137349 A1 | 6/2006 | Pflanz | |
| 2007/0039715 A1 | 2/2007 | Brett | |
| 2009/0282840 A1 * | 11/2009 | Chen et al. | 62/50.3 |

* cited by examiner

*Primary Examiner* — Thomas Denion
*Assistant Examiner* — Laert Dounis
(74) *Attorney, Agent, or Firm* — IP-R-Us, LLC; Peter S. Wong

(57) ABSTRACT

A hybrid solar collector and geothermal system collects low grade heat energy derived from the sun. A simple heat engine converts this energy into mechanical energy, and then into electrical energy using an air-motor-generator setup, by exploiting the difference in temperature between the solar collector and the geothermal heat sinks. Waste heat trapped in an attic is directed to the solar collector to supplement the collection of low grade heat energy. In addition, cryogenic liquid is used to create the temperature difference in the geothermal heat sink when low grade heat energy is unavailable. This system does not produce any $CO_2$ because it does not use combustion to produce electricity.

7 Claims, 9 Drawing Sheets

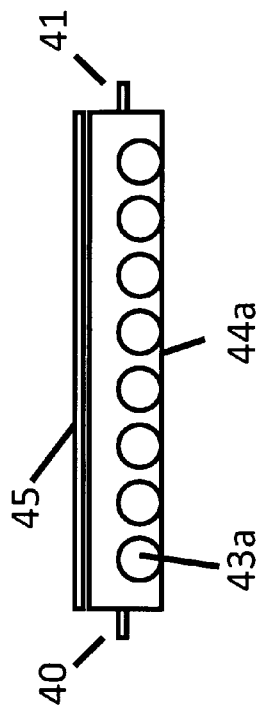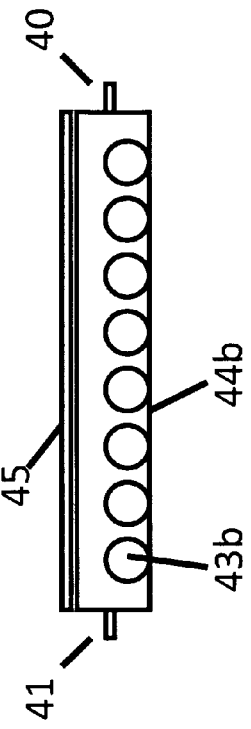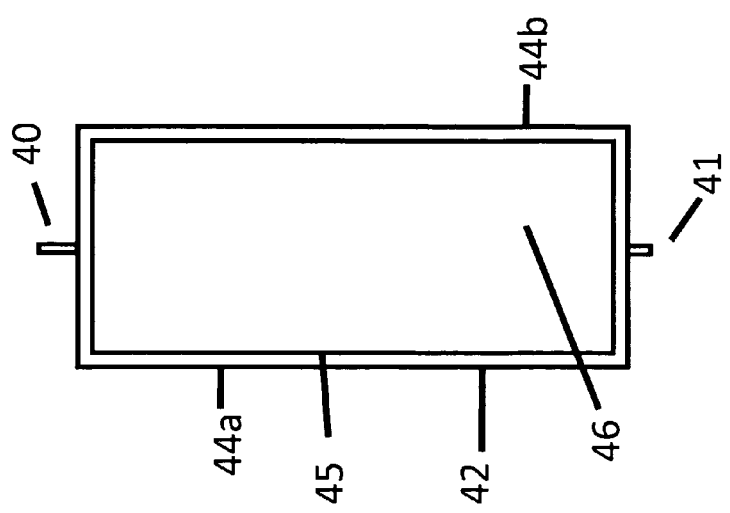
Figure 1b
Figure 1c
Figure 1a

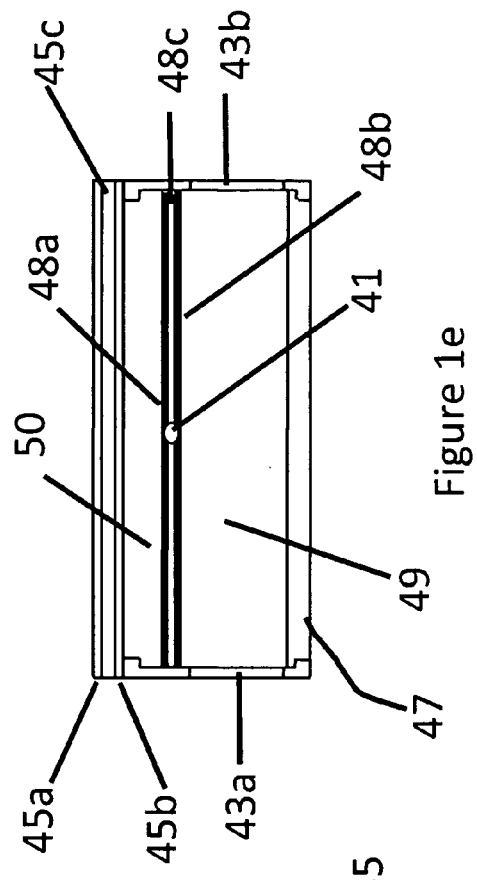
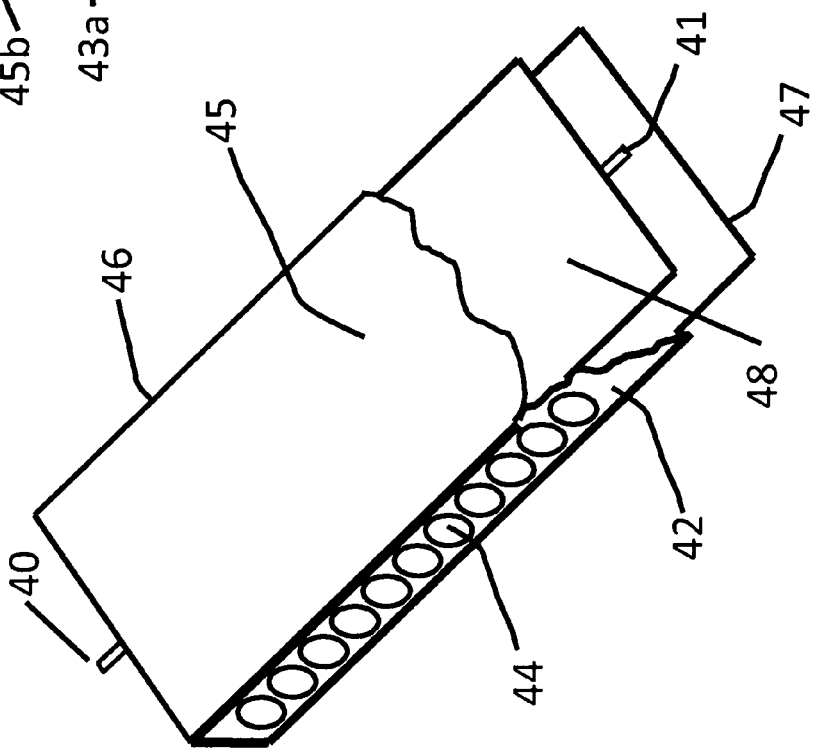
Figure 1e
Figure 1d

HYBRID SOLAR COLLECTOR AND GEO-THERMAL CONCEPT

CROSS-REFERENCE TO RELATED APPLICATIONS

The present patent application is a nationalization of International application No. PCT/US09/03073, filed May 18, 2009, published in English, which is based on, and claims priority from, U.S. provisional Application No. 61/071,781, filed May 16, 2008, both of which are incorporated herein by reference in their entireties.

BACKGROUND OF THE INVENTION

1) Field of the Invention

The present invention relates to a method and apparatus for collecting low grade heat derived from solar energy and converting it into electricity without the use of any hydrocarbon fuels.

2) Related Art

The following definitions are used herein:

Solar Glass: A flat glass plate comprising one or two sheets of glass which transfers a high percentage of the solar energy striking it though both sides of the glass plate while reflecting only a small portion of the solar heat energy back into space for any given solar angle.

R-410a: Is a refrigerant liquid that exhibits a two-phase state, meaning it shifts from a liquid state to a gaseous state when heated. R-410a is used to carry out solar heat and the waste heat recovery because it conducts and stores heat well. R-410a also is used because it has no adverse impact on the environment.

Thermostatic Expansion Valve (TXV): A metering device the main purpose of which is to regulate the flow of a refrigerant, such as R-410a, into an evaporator (m, for example, a hybrid solar panel) at a rate that matches the amount of refrigerant being boiled off in the evaporator. It is actuated by changes in evaporator pressure and superheat of the refrigerant leaving the evaporator. Like all the other metering devices, it also provides a pressure drop in the system in which it is used, separating the high pressure side of the system from the low pressure side, thus allowing low pressure refrigerant to absorb heat onto itself.

Two Stage Air Motor: A motor in which the pressure of confined air causes the rotation of a rotor or the movement of a piston, to drive a second device connected to the rotor or piston. In addition, the air motor is designed with two sections i.e., a) one section optimized for operation using a refrigerant such as R-40I a, b) a second section optimized for operations using compressed nitrogen gas flow. Both sections are mechanically isolated from each other so there is no cross-contamination.

Piston Motor: A motor in which the pressure of an expanding gas causes the movement of a piston, which can be converted into rotating motion.

Thermal Conductivity: The heat flow across a surface per unit area per unit time, divided by the negative of the rate of change of temperature with distance in a direction perpendicular to the surface. Also known as the coefficient of conductivity when heat transfer takes place through conduction, convection and radiation.

High Pressure Line: A line or a pipe with pressure greater than 150 psi.

Low Pressure Liquid Line: A line or pipe with a pressure less than 150 psi.

Motor Generator Interface: The mechanical interface that connects any mechanical motor to an electrical generator for the purpose of generating electricity.

Motor Exhaust Port I: In a two-stage air motor, the exhaust port where a refrigerant, such as R-410a, is at lower dynamic pressure then at the inlet port.

Motor Exhaust Port II: In a two-stage air motor, the exhaust port from which Liquid Nitrogen ($LN_2$) is expelled into the atmosphere.

Saturated Liquid: A liquid solution that contains enough of a dissolved solid, liquid, or gas so that no more will dissolve into the solution at a given temperature and pressure.

Geothermal Heat Sink: A heat sink that is designed to accept a saturated liquid of a given pressure and cool it to a point where it becomes a highly saturated liquid or completely liquid. In addition, it provides a second path for a different liquid like $LN_2$ to extract heat from the surroundings area and convert the liquid into a high pressure gas at high flow rates using the stored heat energy found in the surrounding soil with which it is direct contact.

Circulation Pump: a specific type of pump used to circulate gases, liquids, or slurries in a closed circuit. They are commonly found circulating water in a hydraulic heating or cooling system. Because they only circulate liquid within a closed circuit, they only need to overcome the friction of a piping system (as opposed to lifting a fluid from a point of lower potential energy to a point of higher potential energy).

Generator Control Circuit: A simple control logic card that controls the output of the generator used to maintain voltage and current at some known state.

Solar Energy Density: The energy per unit volume of a region of space for a given location on the surface of the earth. Solar energy density is measured in watts per meter squared. Values vary with location and solar index. The average for Washington D.C. is about 1000 watts/meter-squared.

Hybrid Solar Collector Energy Density: The energy density for the location of a structure plus the potential energy from heat that has penetrated the roof of a structure and has accumulated inside its attic.

Latent Heat of Vaporization: The energy a substance absorbs from its surroundings in order to overcome the attractive forces between its molecules as it changes from a liquid to a gas at constant temperature and pressure, and in order to do work against the external atmosphere as it expands.

Waste Heat Collection: The collection of sensible heat in gases not subject to combustion and used for processes downstream in a system.

Evaporator: the part of a refrigeration system in which the refrigerant absorbs heat and changes from a liquid to a gas.

Liquid Nitrogen ($LN_2$): Nitrogen that exists as a liquid at atmospheric pressure, at $-195°$ C. (77.4 K).

Solar energy is abundant and an attractive method for collecting thermal energy. This area is only now being exploited. Solar photovoltaic devices dominate the collection of solar energy at this time and are used to convert solar energy directly into electricity but at a high cost and a low efficiency. The costs of solar photovoltaic panels are dropping in price, but are still out of reach for most people. Solar energy is collected using a large number of devices, concentrators, flat panels etc., but we still lack systems that are cost effective and can supply electricity in bad weather or at night for personal use. Large solar power plants have been constructed in California in the desert and have made some progress converting large amounts of solar energy into electricity. The down side is these large systems are not designed for the home owner.

Technology has advanced over the years regarding heating and air conditioning where these simple devices are found in almost every home. Modern day heating and cooling systems are being converted to the new R-410a refrigerant since it has less impact on the environment. These heating and cooling systems are only designed to produce heat or cold conditions, not convert or produce electricity. Geothermal heating and cooling systems have been used for years and only now are starting to gain acceptance. The primary use of geothermal energy is for heating and cooling, not for the production of electricity, except in special cases like in Iceland where hot springs are used to drive large steam turbines to produce electricity on a large scale. Thus, the current technology is distributed over a large area of applications.

SUMMARY OF THE INVENTION

It is accordingly a primary object of the present invention to reduce the current technology into one small, economical, affordable working device (referred to herein as the hybrid solar collector and geothermal system) scaled for home use, to supply heating, cooling, and electricity to a structure such as a home.

It is another object of the present invention to provide a method and apparatus for extracting or generating clean electricity using the hybrid solar collector and geothermal interface by exploiting the difference in temperatures between the hybrid solar collector and a geothermal heat sink. Thermal energy is used to drive a piston or turbine using a mechanical device designed to exploit a difference in pressure when R-410a is expanded using solar energy and waste heat which is then converted into rotational torque to drive a conventional 60 Hz generator. The hybrid solar collector and geothermal interface is a closed system. During the R-410a mode of operations, the system is also a "Zero Emission" device. That is, it does not use any combustion to produce electricity or produce any $CO_2$ while producing electricity, and operates in a closed loop while producing electricity.

When the hybrid solar collector array is running at peak capacity, more electricity can be made than can be used in real time. In this case, the extra electricity is used to power a cryogenic refrigerator to produce and store large quantities of $LN_2$ to be used as an alternate fuel to power a structure during times when the sun is not available.

In a second mode of operations for the Hybrid solar collector system, the collection of heat is reversed. Instead of solar heat coming directly from the sun being used to expand R-410a, the geothermal heat sink uses the stored liquid nitrogen ($LN_2$) to extract heat from the ground surrounding the geothermal heat sink. Once produced and stored, the liquid nitrogen is released or directed through the Geothermal heat sink so that heat from the surrounding area is absorbed into the liquid nitrogen, expanding it to great pressure and volume (just like the R-410a). However, in the second mode of operation, the energy comes from the soil around the geothermal heat sink. This captured geothermal energy is used to drive a piston or turbine, converting the pressure difference into rotational torque or mechanical motion sufficient to drive a conventional 60 Hz generator. Once the mechanical energy is removed for the nitrogen gas that flows through the two stage air motor, the nitrogen gas is exhausted back into the atmosphere, returning it unchanged, closing the loop and making it available for the next cycle.

In effect, in the second mode of operation, the hybrid solar collector and geothermal system can also be considered a "Zero Emission" device, because it does not use any hydrocarbon fuels or combustion to produce electricity or produce any $CO_2$ while producing electricity. Nitrogen gas makes up 78% of the Earth's atmosphere and is considered an inert gas when not heated. By using this double energy conversion cycle, the hybrid solar collector and geothermal heat sink reduce the $CO_2$ footprint and lowers carbon emissions dramatically.

Other objects, features and advantages of the present invention will be apparent to those skilled in the art upon reading of this specification including the accompanying drawings.

BRIEF DESCRIPTION OF THE DRAWINGS

The invention is understood better by reading the following Detailed Description of the Preferred Embodiments with reference to the accompanying drawing figures, in which like reference numbers refer to like elements throughout, and in which:

FIG. 1a is a top view of the Hybrid Solar Panel (HSP), showing the basic frame construction.

FIGS. 1b and 1c are side views of the attic side ports of the HSP. FIG. 1d provides a cross-section view of the HSP.

FIG. 1e is an end view showing the stacking order of the HSP main parts.

DETAILED DESCRIPTION OF THE PREFERRED EMBODIMENTS

Figure 1:
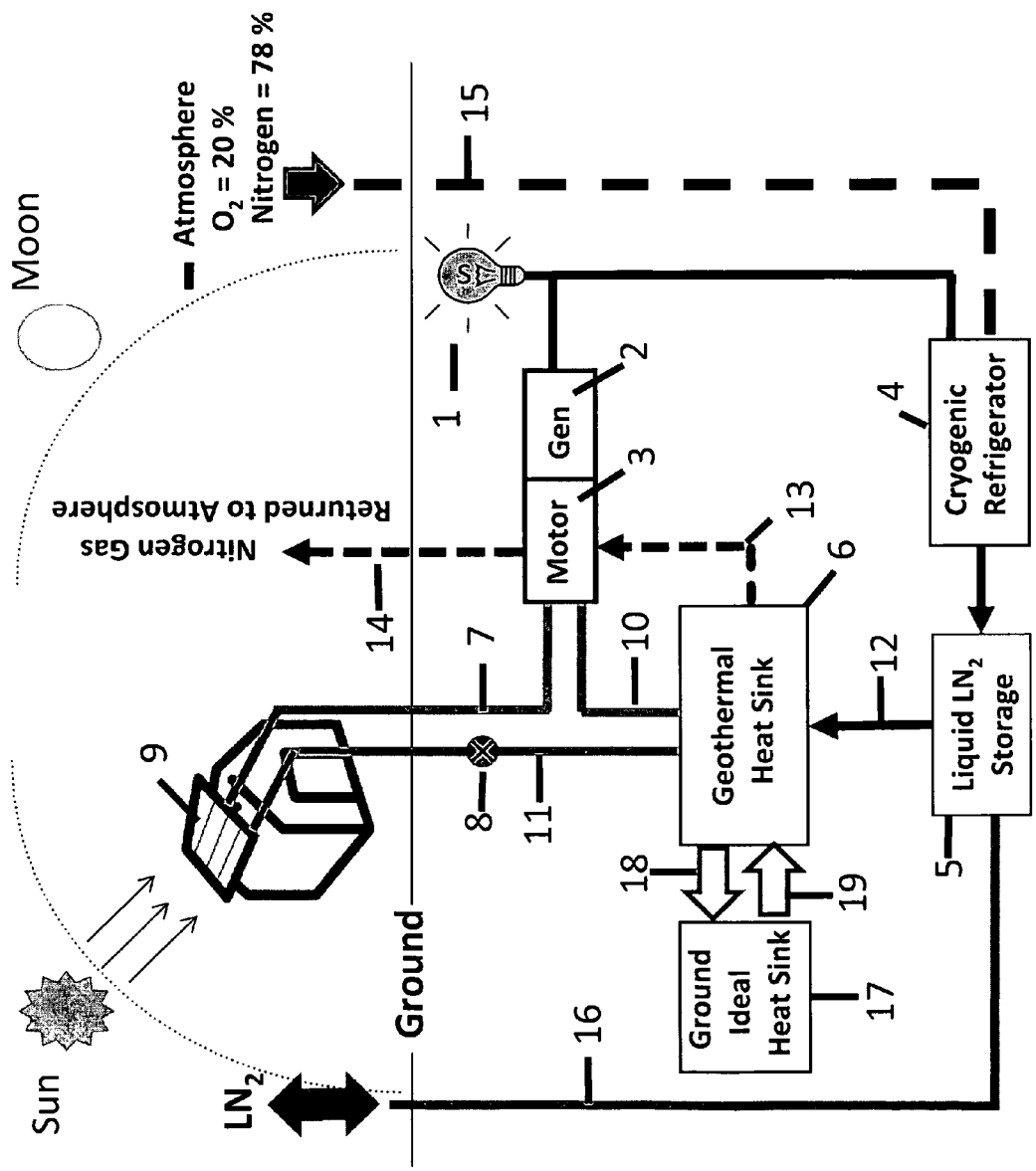
FIG. 1 is a schematic illustration or top drawing of a hybrid solar collector and geothermal system in accordance with the present invention, providing an overview as to how the primary parts of the system are connected.

In describing preferred embodiments of the present invention illustrated in the drawings, specific technology is employed for the sake of clarity. However, the invention is not intended to be limited to the specific terminology so selected, and it is to be understood that each specific element includes all technical equivalents that operate in a similar manner to accomplish a similar purpose.

Referring now to FIG. 1, there is shown a hybrid solar collector and geothermal System in accordance with the present invention. All the primary systems and parts of the hybrid solar collector and geothermal System are shown in FIG. 1, in which the reference numbers correspond to the systems and parts as follows:

1 $CO_2$ free electrical output
2 generator
3 two stage air-motor
4 cryogenic refrigerator 5 LN₂ storage
6 geo-thermal heat sink
7 high pressure high volume gas line
8 circulating pump
9 hybrid solar collector array (HSCA)
10 saturated low pressure line
11 liquid R-410a line
12 liquid nitrogen line
13 high pressure nitrogen line
14 nitrogen exhaust port
15 atmosphere inlet
16 LN₂ external fill and access port
17 block representation of earth ground
18 R-410a heat flow direction
19 liquid nitrogen heat flow direction
30 insulation
31 reflective coating &air channel
32 roof vent
33 heat collection area
34 roof shingles
35 cold air duct return right side
36 cold air duct return left side
37 top gusset plate
40 outlet high pressure gas line
41 inlet low pressure liquid line
42 hybrid solar panel frame
43a left side air ports
43b right side air ports
44 attic air ports
44a HSC left side
44b HSC right side
45 solar glass plates
45a top solar glass plate
45b bottom solar glass plate
45c argon filled gas insulation
46 hybrid solar panel (HSP)
47 thermal insulation blanket
48 HSP heat absorber
48a solar heat absorber surface
48b attic hot air heat absorber surface
48c R-410a liquid expansion area
49 attic hot air duct area
50 solar heat absorber area The hybrid solar collector (HSC) array in accordance with the present invention is designed to produce an electrical output 1 which is compatible with the present power distribution system 115 VAC at 60 Hz. In the example described herein, a generator 2 is designed to provide up to 30 Kilowatts of power, to meet or exceed home demands and have sufficient electrical energy to power a liquid nitrogen cryogenic refrigerator 4 and produce large quantities of liquid nitrogen for storage in a special liquid nitrogen storage container 5. Solar energy and waste heat are captured and used to expand liquids like R-410a and liquid nitrogen (LN 2).

A motor 3 is provided to convert a pressure difference into mechanical energy. The motor 3 has two different stages. "The first stage is for use with R-410a and the second stage is designed to use liquid nitrogen (LN₂). The motor is referred to as an air-motor, because it does not use combustion to develop its rotational torque to drive the generator.

One of the primary goals of the hybrid solar collector system is to produce more electricity than can be used. This excess electricity is used to compress the atmosphere using line 15 and produce liquid nitrogen using a commercially-available cryogenic refrigerator 4. During the solar day, electricity demands are given first priority, but any excess electricity is used to produce liquid nitrogen (stored in storage containers 5), so the system can continue to produce electricity after the sun goes down or in case of bad weather.

The system is easily sized to meet the full electrical needs of a structure such as a home. Liquid nitrogen (LN₂) provides a safe storage of potential cold energy to be converted back in to electricity using a geothermal heat sink 6. The system in accordance with the present invention can supply more than enough liquid nitrogen to power the structure for days off a single good solar day, reducing the need to use energy from the power grid. The Geothermal heat sink 6 is designed to work with two liquids, R-410a and liquid nitrogen (LN₂). The concept is to collect solar heat energy and waste heat to expand R-410a in mode one, where solar energy is used directly in real time. This heat is then used to expand the R-410a so that work can be done on the expanded high pressure gas and liquid 7, using the high pressure, high volume gas to drive the motor 3 which is connected to the generator 2. Once the high pressure gas 7 moves through the motor 3 it is reduced in pressure 10 and volume because energy was removed and is now a saturated low pressure liquid. This low pressure saturated liquid then flows into the Geothermal heat sink 6 where the remaining heat is rapidly conducted off the R-410a liquid, forcing it to convert back into a full liquid and the heat is conducted into the ground 17 or soil that surrounds the Geothermal heat sink 6.

The earth is known to be an infinite heat sink, so it has the capacity to absorb massive amounts of heat, which flow away 18 from the heat sink cooling the R-410a back into a liquid. Once the R-410a is converted back into a liquid it returns to the Hybrid solar collector array 9 by using a small circulating pump 8 flowing through the liquid line 11.

In the second mode of operations the sun has set or clouds cause some kind of a drop out in R-410a expansion so the system converts automatically over to the liquid nitrogen (LN2) storage 5 and directs the liquid through line 12 into the Geothermal heat sink 6 where the heat sink now conducts heat 19 into the liquid nitrogen. There is a major difference in temperature between liquid nitrogen (LN₂) and the surrounding soil. Liquid nitrogen is very cold, and the surrounding soil is much hotter, so heat will change direction and be conducted into the liquid nitrogen. The liquid nitrogen absorbs this heat and expands as much as 600 times, transforming into a high pressure, high volume gas flow that is directed into the motor using cryogenic high pressure line 13. The operations are fully automatic, so as to maintain the full electrical output needed to run a structure. Once the nitrogen gas expansion energy has been extracted by the two stage motor it is exhausted 14 back into the atmosphere completing the cycle. For improved utility, a second liquid nitrogen (LN₂) line can be installed so that the liquid nitrogen (LN₂) storage tanks 5 can be filled using an external source or supplier.

The HSC array collects the sun's solar energy using multiple flat plate collectors (panels) designed to collect the sun's energy on the front surface while at the same time collecting or scavenging low grade waste heat from a secondary source like the attic of a structure.

The Hybrid Solar Panel (HSP) is a component designed to extract heat from both its top and bottom surfaces, as well as to conduct heat flowing through and over it from the attic while at the same time channeling R-410a or other liquids that expand when heated. The hybrid solar panel is also designed to control the expansion of a liquid into gas at a given rate so as to provide a continuous flow of pressure and volume while connected into the HSC array using a 4 by 8 array of individual HSP units, which act as one very large high efficiency heat absorber.

The air inside an attic is warmed by the conduction of solar heat energy, and thus becomes a potential energy storage device that can be tapped. The potential energy in the attic can be directed into the hybrid solar collector array, which converts the potential energy into high pressure, high volume gas used to drive the two stage air motor 3 and generate electricity. The HSCA thus is used for waste heat collection, in that it uses the hot air residing in the attic to power the structure, by converting the hot air into a high pressure, high volume gas.

The HSP has three main parts: a) high performance solar glass panels providing weather protection, b) a center core through which a liquid flows, and designed to allow the liquid to expand when heated, and c) a frame for each panel which provides the mechanical interface to hold and contain the various parts in one unit. The core has a front side (facing the sun) and a back side (facing the roof) designed to be a secondary heat absorber or collector. The front of the HSP is designed to capture the direct solar energy and convert this energy into a vapor using a liquid that expands when heated. The back side is used to capture waste heat derived from the attic.

As shown in FIG. 1a the HSP is covered with solar glass 45 providing weather protection. The HSP frame 42 provides mechanical strength so the components can be mounted in their proper locations. Referring to FIGS. 1b and 1c, on both sides 44a and 44b of the HSP, are side ports 43a, 43b made to flow low grade heat extracted from the attic through the HSP, which is forced to flow cross-coupled through the Hybrid Solar array and return to the attic at a lower temperature and location. In addition, on one end of the HSP is located a high pressure gas outlet line 40 and on the other end is located a low pressure liquid inlet line 41, used to flow the R-410a refrigerant or like liquid.

A Thermal Barrier 47 is a special panel or blanket provided on the back side of the HSP to restrict the flow of heat into and away from the backside of the Hybrid Solar Panel, and to reflect infrared heat back into the hybrid solar collector. The panel is made up of multiple layers of materials placed and isolated in the panel so as to produce multiple thermal barriers to stop the conduction of heat or the transfer of heat, as well as radiation in the infrared wavelengths out the backside of the collector.

FIG. 1d provides a second view of the Hybrid Solar Panel (HSP) 46 and shows how the solar glass plates 45 are installed, the heat absorber 48, and the stacking order of the thermal insulating blanket 47.

Heat is conducted into the attic hot air heat absorber surface 48b expanding the R-410a like liquid flowing in the channel designed to use the R-410a liquid expansion area 48c. Solar energy passes through the solar glass 45, the top solar glass plate 45a, then the Argon fill gas insulation gap 45c, then passes through the bottom solar glass plate 45b into the area designed to capture the solar heat, the solar heat absorber surface 48a and the solar heat absorber area 50. This provides multiple opportunities to capture all the solar heat.

In the case of the Hybrid Solar Panel, both sides of the main heat absorber are used to improve the evaporation rate of the R-410a liquid to gas because heat is conducted from two surfaces 48a and 48b, as shown in FIG. 1e. Heat is then conducted into the R-410a liquid expansion area 48c, which is designed to hold high pressure gas and expel high volumes of gas.

Figure 2:
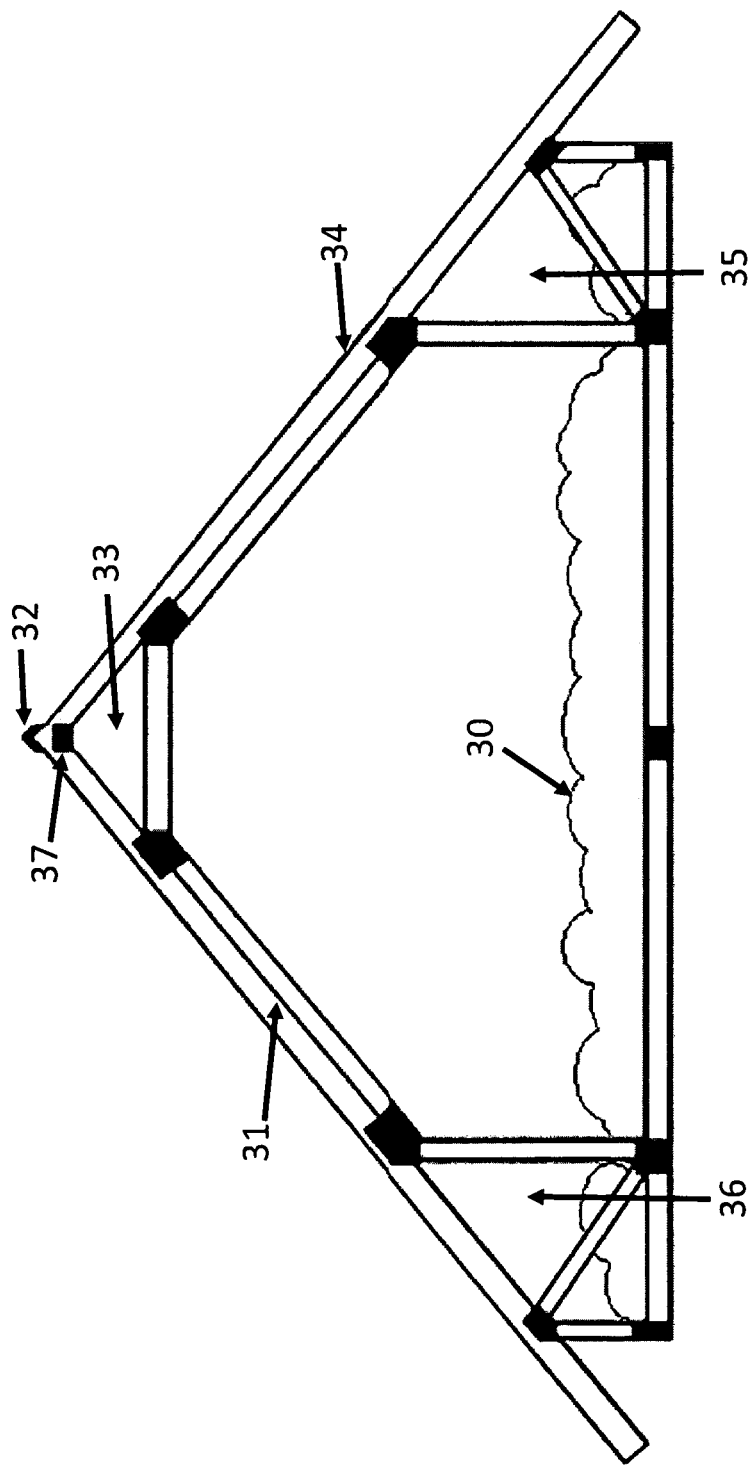
FIG. 2 is a drawing of a conventional home attic.
Figure 3:
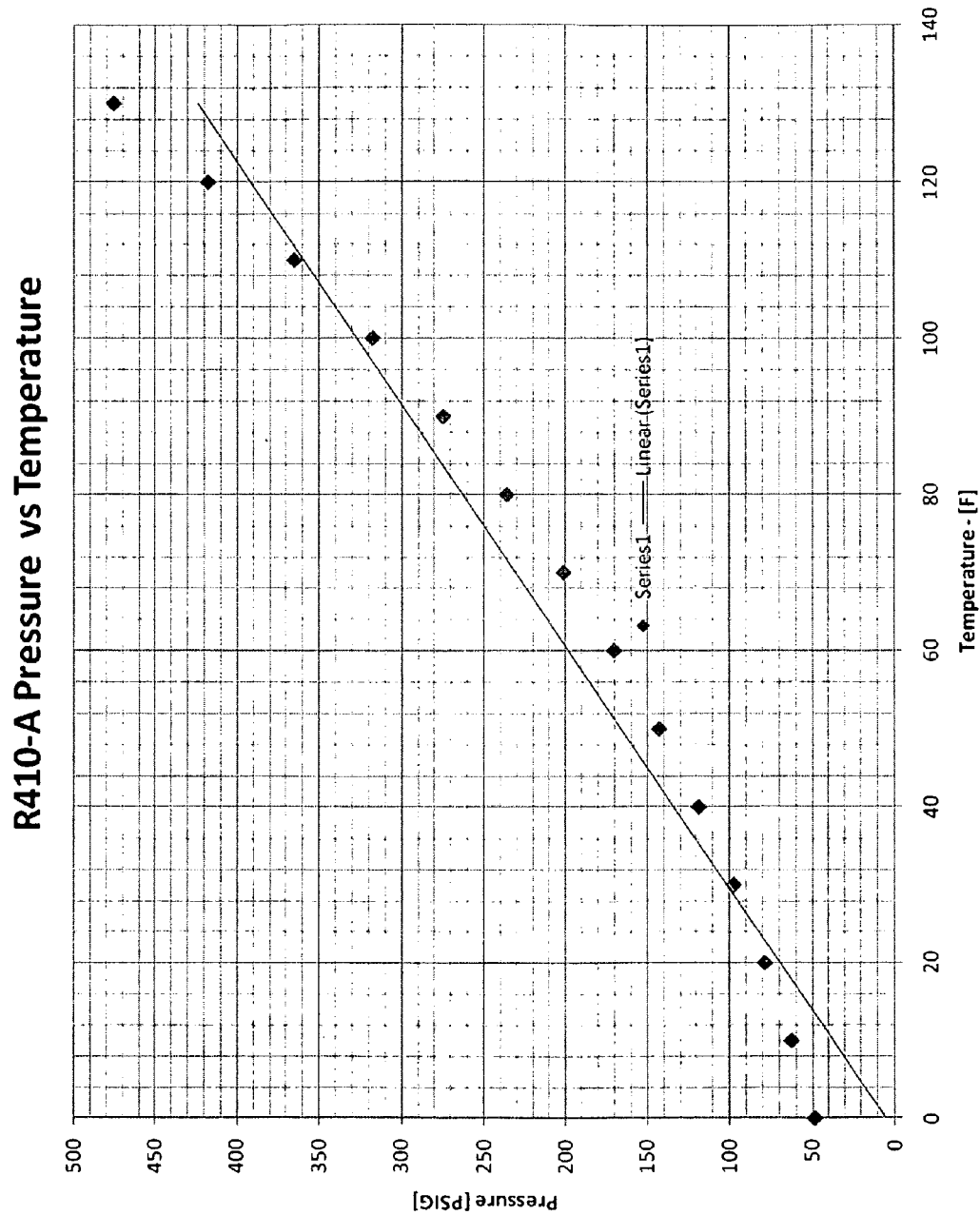
FIG. 3 is a graph showing the relationship of R-410a, Pressure vs. Temperature.

FIG. 2 is a drawing of a normal attic found in most homes. This drawing shows how the pitch of the roof provides a natural channel for the heat to rise into the area called the heat collection area 33 that has flowing to the top section or peak of the roof where just above the top gusset plate 37 is found a roof vent 32 which covers the full length of the roof. The location where heat is removed or ducted is the heat collection area 33. To improve the collection of heat, a small air channel is made using a reflective coating material 31. The air channel channels the heat next to the inside of the roof structure, improving the heat transfer and conduction. Once the hot air is removed using the heat collection area 33 and passes through the HSCA, it is returned to the attic using cold air duct return right side 35 and cold air duct return left side 36. To keep the heat from penetrating the home the ceiling is covered with high, quality insulation 30.

To clarify, the generator 2 can be driven by the two stage air motor using two different gases. Once passing through the motor, the mechanical energy is used to drive a generator whose electrical output is used to power the electrical needs of the structure, run its utility meter backwards (earning electrical credits if desired), and power the cryogenic refrigerant system designed to produce liquid nitrogen ($LN_2$) as a byproduct. The liquid nitrogen can be used as a fuel during inclement weather or between sunset and sunrise, to enable electricity to be generated over longer periods of time than a normal solar day.

The system is designed to produce more electricity than will be used during the day when there is ample solar energy hitting the HSCA, as well as the full roof of the structure on which it is installed. This electricity is clean, and has a "Zero $CO_2$" foot print, because only solar heat energy is used. No hydrocarbon fuel is required to support the electrical needs of the structure during this period.

After the high pressure R-410a gas flows through the two stage air motor-generator and extracts the potential energy the R-410a drops in pressure as well as converts back into a lower pressure gas, which is highly saturated with large particles or droplets of R-410a. This low pressure saturated liquid is forced through a pipe 10 connected to the Geothermal heat sink 6 where the surface is in direct contact with the surface of the earth's soil 17, ground providing a good thermal conductive path for heat to flow into and be dissipated into the surrounding soil. The sub surface of the ground has a relative constant temperature between 50° F. and 60° F.; and is considered an infinite heat sink, meaning it requires massive amounts of thermal energy to make even small changes of a few degrees over time. This stable low temperature is low enough to cause the R-410a refrigerant to condense and give up the remaining heat it contains converting back into a full liquid at some pressure.

The Geothermal heat sink 6 is designed to give off large amounts of waste heat and convert R-410a back into a liquid, without the expenditure of any additional energy input. In this case the Earth's core temperature is sufficient to cool the R-410a back into a liquid without the use of any man made energy expenditure, unlike a heat pump which uses an electrical motor driving a fan and a compressor to compress the semi saturated R-410a back into a full liquid.

The Hybrid solar system is designed to convert as much of the solar energy as possible into electricity to run a structure in real time, followed by, to run the structure's utility meter backwards and last, to run the structure's cryogenic refrigerant system to produce a steady flow of $LN_2$, which is stored in an underground cryogenic storage container for later use. The Hybrid solar collector and geothermal system, in combination with the cryogenic refrigerator interface, is a unique system. Now vast amounts of solar energy can be stored in the form of $LN_2$ Using improved Dewar technology one should be able to store many thousands of watts of electricity in the form of $LN_2$. $LN_2$ can be used to drive a generator without the use of combustion or a hydrocarbon fuel.

During the night or intermittent cloud cover $LN_2$ can be redirected back into the second stage of the air motor designed to operate using expanding nitrogen gas instead of R-410a, providing a constant output from the generator.

The two stage air motor-generator is designed to operate on both R-410a and nitrogen gas. While operating in the nitrogen gas phase the motor uses the stored $LN_2$ as a fuel.

The $LN_2$ is forced back through the geothermal heat sink 6 through different channels so as to collect heat from the surrounding soil 17, which is known to be at a relatively constant temperature of 50° F. to 60° F. The large difference in temperature between $LN_2$ and the surrounding soil (which is estimated to be about ~380° F.) causes the $LN_2$ to expand approximately 600 times, producing a very high flow rate and pressure, which is used to turn or push the piston or turbine to generate electricity, just like the R-410a does when sunlight is available.

This aspect of the invention provides an improvement in solar energy conversion because it allows the storage and capture of an inert gas like nitrogen, which can be extracted from the atmosphere at every location on the planet. In addition, the nitrogen resource is not affected in any harmful way by temperature, because it is in the cryogenic state and then released back into the atmosphere without any combustion effects. The two stage air-motor-generator therefore is a "Zero Emission Generator," that is, it can produce clean $CO^2$ free electricity without combustion.

Figure 4:
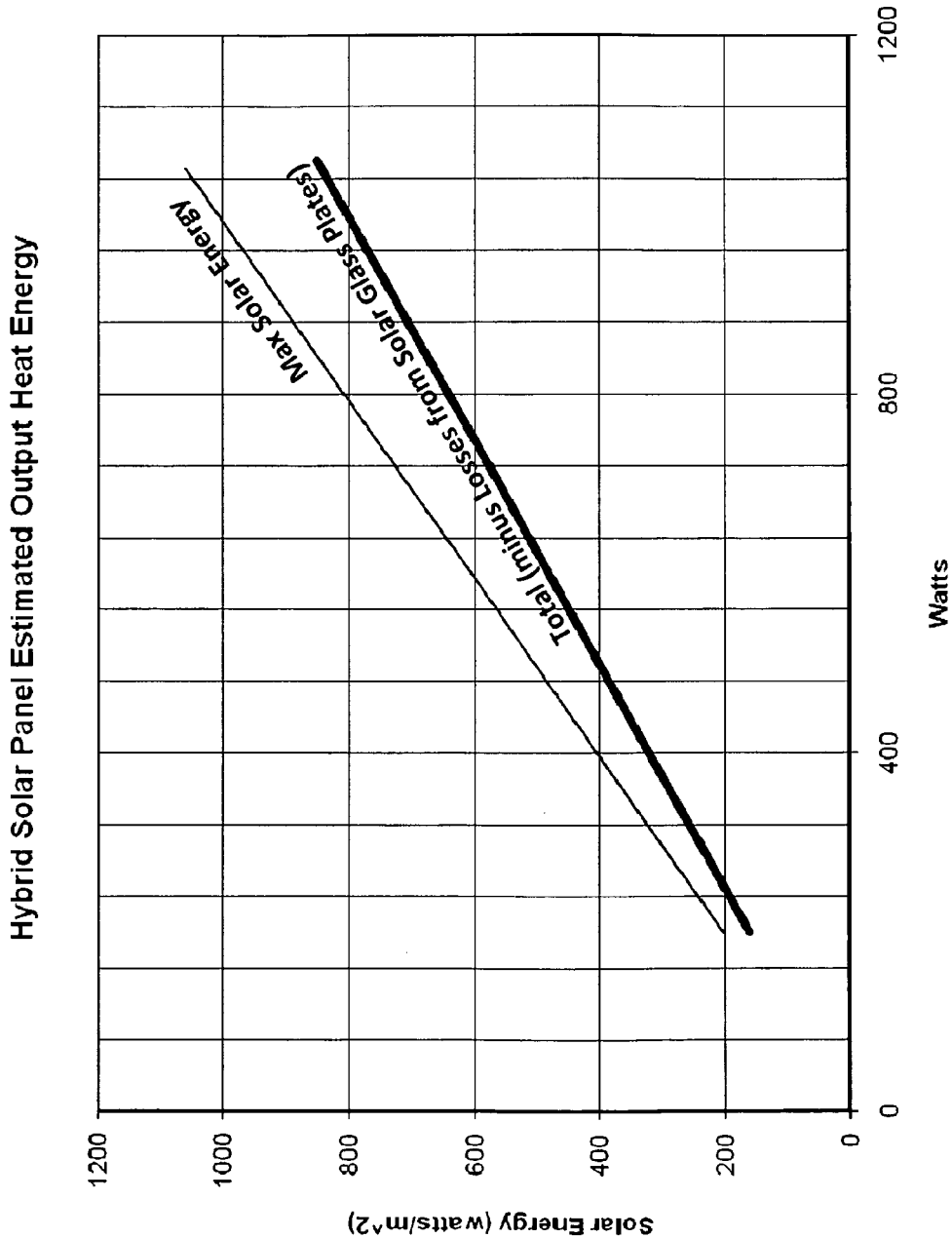
FIG. 4 is a graph showing the possible output in heat energy of a single Hybrid solar panel in watts/$m^2$, along with measured losses of the selected solar glass.

It is known that the average solar energy hitting the surface of the planet is around 1000 watts/meter$^2$. This is a physical limit. The Hybrid solar collector is designed to deliver ~1000 watts derived from direct solar input energy alone, as shown in FIG. 4. A Hybrid solar collector array with 32 panels would provide about 38 Kilowatts peak or direct solar low grade heat energy during a typical 5 hour solar day. If one could collect ~80% of this output from direct sun light, then one would have access to ~30 Kilowatts of heat energy per hour, which far exceeds the normal energy level required to run a home.

The hybrid solar collector and geothermal system is designed to exploit the total surface of a structure's roof. For example, a roof of 2500 sq-ft can absorb an estimated 232 Kilowatts of solar energy per hour. Naturally, some of this solar energy is reflected off the surface of the roof, but a large portion of this solar heat also penetrates through the roofing materials into the attic. The roofing materials act like a large, free storage mass, soaking up the solar heat energy.

An Attic Heat collector is used to control the roof exhaust or breathing of the home to allow the control and channeling of hot attic air from the attic area to the Hybrid Solar collector array, where the low grade dispersed heat is converted into high pressure, high volume gas. The attic air is then returned back to the attic closing the loop.

The Hybrid solar collector array has access to a surface area (the surface area of the roof) that is an order of magnitude larger than the surface area of the Hybrid solar collector array itself, to extract low grade heat. As a result, and also because of its integrated nature and small foot print, the Hybrid solar collector array has a major cost advantage over other solar technologies in use today. The principles of the invention also apply to larger structures with equal results.

A simple thermostat and ducts can be used to control the roof exhaust or breathing of the home to allow the control and channeling of hot attic air from the heat collection area to the HSCA where the low grade dispersed heat is converted into high pressure, high volume gas.

The low grade heat saturating the roof materials and penetrating the roof structure is collected using the standard heat ducts, which are used to collect the heat that is normally wasted during the day using conventional roof vents to exhaust this excess heat gain out of the home to reduce air conditioning cost. The heat collecting ducts are connecting directly into the Hybrid solar collector backside. Small fans are used to force this hot air into the back side of the HSCA where R-410a can be further expanded. The forced air is then returned to the attic to pick up heat once more completing the cycle.

The hybrid solar collector Energy Density is the energy density for the location of a structure plus the potential energy from heat that has penetrated the roof of the structure and has accumulated inside the attic. The air inside of an attic is warmed by the conduction of solar heat energy and becomes a potential energy storage device that can be tapped. The potential energy in the attic can be directed into the HSCA and converted into high pressure, high volume gas used to drive a two stage air motor to generate electricity.

Figure 5:
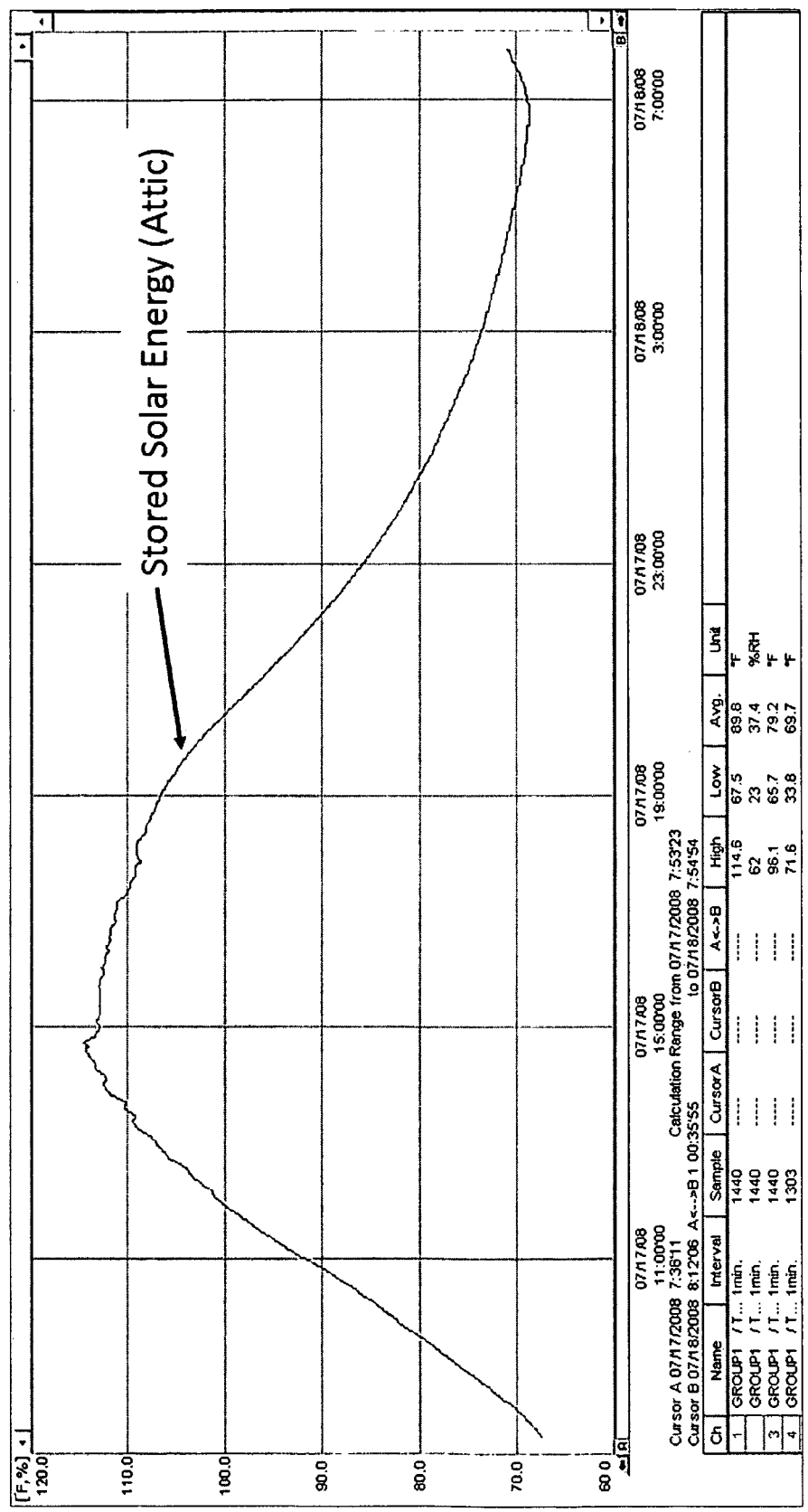
FIG. 5 is a graph of a thermal profile of a typical attic showing the temperature rise over a full sunny day. The gray block denotes the stored solar energy in the attic.
Figure 6:
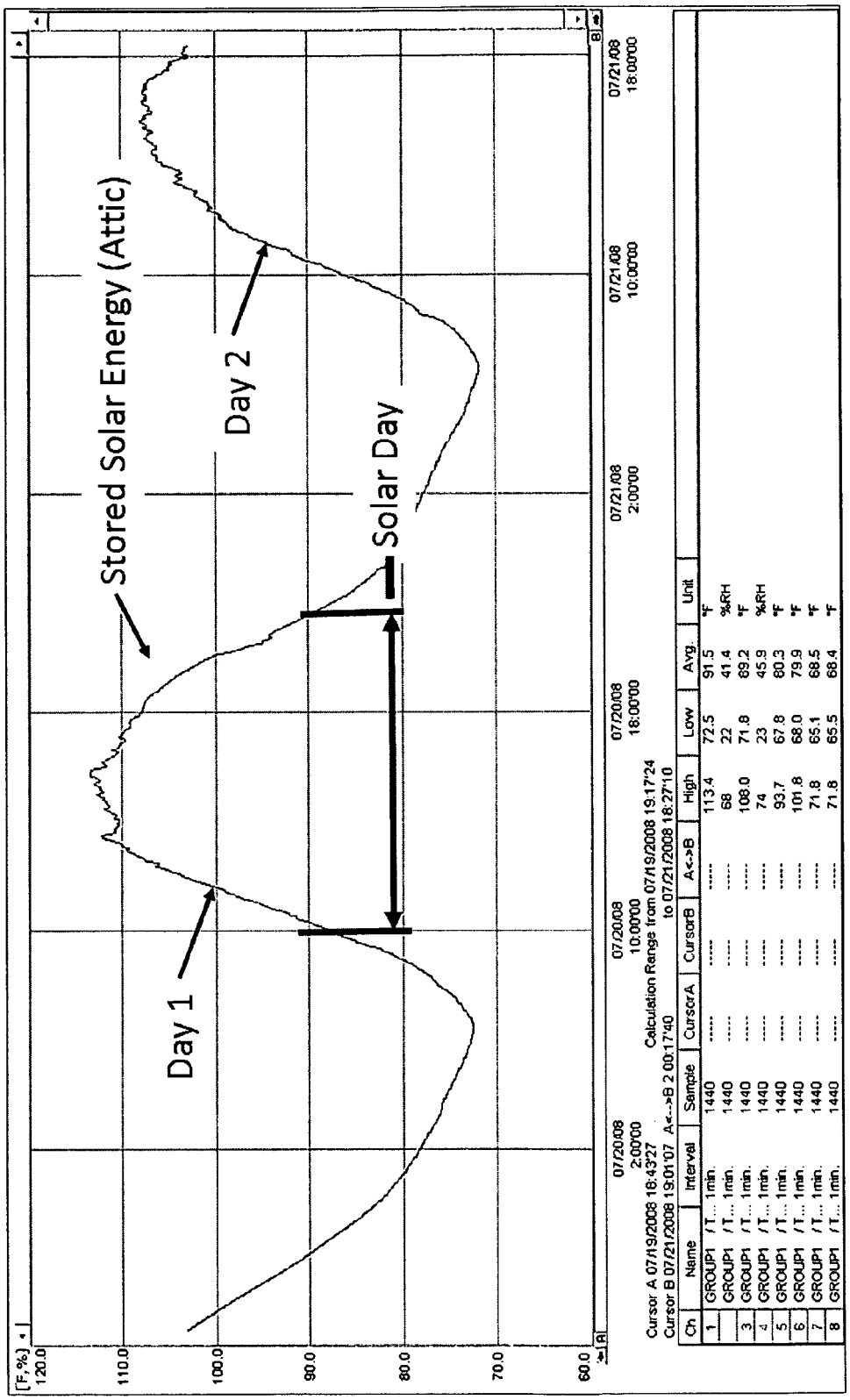
FIG. 6 is a second thermal profile of a typical attic, showing how the temperature rise relates to the solar day. The gray block indicates the stored solar energy in the attic. With respect to the second day, the graph shows how stored solar energy can change due to weather 25 conditions.

In effect, this additional heat collected from the attic increases the performance of the collector by a factor of two, since the heat coming directly from the sun is on the front surface while the heat coming from the attic is being conducted through the backside surface of the Hybrid solar panel. FIGS. 5 and 6 are graphs showing the solar energy density found in the attic for a given period of time for a normal solar day. Under these conditions, R-410a can be completely vaporized into a high pressure gas providing high flow rates for up to 5 hours. This means that one could produce ~450 Kilowatts/hrs. per solar day of clean electrical energy without the use of any hydrocarbon fuel or combustion, provided the system in accordance with the invention is set up to take full advantage of this much electricity.

Figure 7:
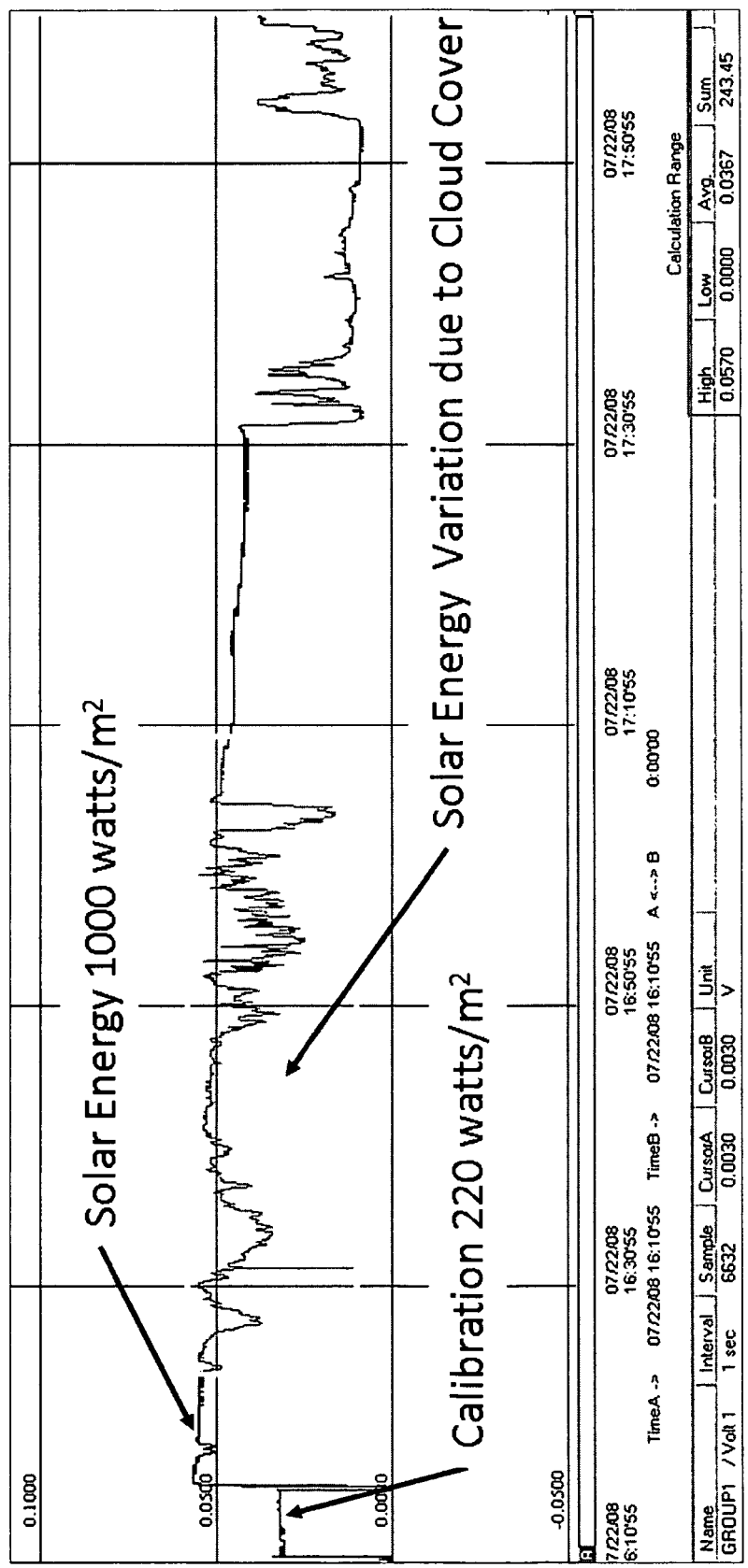
FIG. 7 is an example of a solar profile for a given day showing how much energy is available to convert. Reading the chart from left to right, a conventional 60 watt light bulb was used as a calibration source, then the sensor was exposed to direct sun light, peaking out at ~1000-watts/$m^2$. Variation of the sensor output was due to passing cloud cover.

Referring to FIG. 7, there is shown a solar profile for a normal solar day with a few small clouds moving overhead. Starting from the left side of the graph, there is shown a calibration using a small light bulb. Once the calibration is done, the photovoltaic solar cell is placed outside in direct sun light. As expected, clouds reduce the amount of solar energy hitting the collector, as well as the roof. One of the technical advantages of the Hybrid solar collector system is that the roof absorbs solar heat energy and acts like a sponge. This in effect reduces dropouts in the production of electricity in the Hybrid solar system, because the attic temperature does not have a fast response or drop in temperature like the HSCA, providing a constant output over time and allowing the ZEG to remain constant in producing electricity.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A process for generating $CO_2$ free electricity using a structure having a roof and an attic, comprising the steps of:
    collecting low grade solar heat;
    collecting waste heat derived from the roof total surface area which has penetrated into the attic;
    using servos and control logic to control the amount of waste heat collection to combine with the low grade solar heat collection;
    using the combined low grade solar heat and waste heat to expand a refrigerant to a high pressure, high volume gas;
    using the high pressure, high volume gas to drive an air-motor-generator design to convert mechanical energy into electrical energy;
    using a geothermal heat sink for cooling the high pressure, high volume gas to a liquid by conducting heat into the surrounding soil or liquid;

using the geothermal heat sink for heating a cryogenic liquid to a high pressure gas;

using the high pressure gas produced by the heated cryogenic liquid to drive the air-motor-generator design to generate electricity when the low grade solar heat and waste heat become unavailable.

2. A process for generating $CO_2$ free electricity as claimed in claim 1 further comprising the steps of:

compressing atmospheric air using a cryogenic refrigerator to produce the cryogenic liquid; and storing the cryogenic liquid in a container.

3. A hybrid solar collector and geothermal system comprising:

an array of solar collectors;

each of the solar collectors has one side exposed to collect solar heat, and an opposite side exposed to collect waste heat;

a cryogenic refrigerator for compressing atmospheric air into a cryogenic liquid;

a storage container for storing the cryogenic liquid;

a geothermal heat sink;

an air-motor;

a first conduit system carrying a refrigerant connecting the solar collector array, the geothermal heat sink and the air-motor to form a closed-loop;

a second conduit system carrying the cryogenic liquid from the storage container connecting the geothermal heat sink and the air-motor; and a generator for converting mechanical energy of the air-motor into electrical energy.

4. A hybrid solar collector and geothermal system as claimed in claim 3, further comprising:

automatic controls to control the amount of the waste heat to the opposite side of the solar collectors.

5. A hybrid solar collector and geothermal system as claimed in claim 3, further comprising:

an external access port on the storage container for filling cryogenic liquid not produced by the cryogenic refrigerator.

6. A hybrid solar collector and geothermal system as claimed in claim 3, wherein:

the array of solar collectors are mounted on a roof;

the waste heat is hot air trapped in an attic of the roof;

the refrigerant is a R-410a type; and the cryogenic liquid is $LN_2$.

7. A hybrid solar collector and geothermal system as claimed in claim 3, wherein:

the second conduit system is automatically switched on when the solar heat and waste heat become unavailable.

* * * * *